United States Patent [19]
Dyson et al.

[11] Patent Number: 5,893,938
[45] Date of Patent: Apr. 13, 1999

[54] DUST SEPARATION APPARATUS

[75] Inventors: James Dyson, Bathford; Andrew Walter McRae Thomson; Simon Mark Bickerstaff, both of Malmesbury, all of United Kingdom

[73] Assignee: Notetry Limited, Little Somerford, United Kingdom

[21] Appl. No.: 08/860,112

[22] PCT Filed: Dec. 20, 1995

[86] PCT No.: PCT/GB95/02986

§ 371 Date: Aug. 8, 1997

§ 102(e) Date: Aug. 8, 1997

[87] PCT Pub. No.: WO96/19293

PCT Pub. Date: Jun. 27, 1996

[51] Int. Cl.$^6$ .............................. A47L 9/16; B04C 5/185
[52] U.S. Cl. ........................ 55/426; 55/447; 55/459.1
[58] Field of Search ...................... 55/426, 447, 459.1

[56] References Cited

U.S. PATENT DOCUMENTS

| | | | |
|---|---|---|---|
| 735,954 | 8/1903 | Derby | 55/426 |
| 2,071,975 | 2/1937 | Holm-Hansen et al. | 55/426 |
| 2,769,546 | 11/1956 | Fontein | 55/459.1 |
| 3,056,662 | 10/1962 | Ridgway | 55/426 |
| 3,426,513 | 2/1969 | Bauer | 55/426 |
| 3,802,570 | 4/1974 | Dehne | |
| 3,955,948 | 5/1976 | Campolong | 55/426 |
| 4,005,998 | 2/1977 | Gorman | 55/426 |
| 4,826,515 | 5/1989 | Dyson | |
| 4,853,011 | 8/1989 | Dyson | 55/459.1 |
| 5,078,761 | 1/1992 | Dyson | 55/459.1 |
| 5,090,976 | 2/1992 | Dyson | |

FOREIGN PATENT DOCUMENTS

| | | |
|---|---|---|
| 0068792 A2 | 1/1983 | European Pat. Off. |
| 0313197 A3 | 4/1989 | European Pat. Off. |
| 0447887 A1 | 9/1991 | European Pat. Off. |
| 732840 | 6/1955 | United Kingdom |
| 1397863 | 6/1975 | United Kingdom |
| 2199267 | 7/1988 | United Kingdom |
| WO 695347 | 8/1953 | WIPO |
| WO 92/17278 | 10/1992 | WIPO |

*Primary Examiner*—C. Scott Bushey
*Attorney, Agent, or Firm*—Ian C. McLeod; Mary M. Moyne

[57] ABSTRACT

The invention provides apparatus (10) for separating dirt or dust from an airflow including a frustoconical cyclone (12) having a tangential air inlet (16) located at or adjacent the end of the cyclone having the larger diameter and a cone opening (18) located at the end of the cyclone having the smaller diameter. A collector (20) is arranged so as to surround the cone opening and has a base surface (24) facing towards the cone opening. According to the invention, at least a portion (24a) of the base surface is conical or frusto-conical in shape and a dust-retaining wall (30) is provided spaced from the center of the base surface. This allows the apparatus to be reduced in size without substantially affecting the separation efficiency

36 Claims, 3 Drawing Sheets

DUST SEPARATION APPARATUS

FIELD OF THE INVENTION

The invention relates to apparatus for separating dirt or dust particles from an airflow by cyclonic means. The invention relates particularly, but not exclusively, to cyclonic dust separation apparatus for use in a vacuum cleaner.

DESCRIPTION OF THE RELATED ART

Cyclonic dust separation apparatus typically comprises a frusto-conical cyclone having a tangential air inlet at the end having the larger diameter and a cone opening leading to a dirt or dust collector at the end having the smaller diameter. The dust collector is generally cylindrical in shape and is considerably larger in diameter than the cone opening, normally having a diameter of at least three times that of the cone opening. In operation, an airflow carrying dirt and dust with it enters the cyclone via the air inlet and, by virtue of the tangential orientation of the air inlet, is set into a swirling motion over the interior surface of the cyclone. Most of the air of the airflow escapes from the cyclone by passing towards the longitudinal axis of the cyclone and exiting via an exit passage arranged substantially centrally of the end of the cyclone having the larger diameter. The remainder of the airflow spirals towards the cone opening at increasing angular speeds carrying the dirt and dust with it and is ejected into the dust collector, whereupon the dirt and dust particles are flung towards the cylindrical wall of the collector. The dirt and dust particles then collect in the lower regions of the cylindrical wall, whilst the remainder of the airflow exits from the collector via the cone opening and the exit passage.

It is generally desirable for cyclonic dust separation apparatus to be relatively compact, particularly as regards the overall length of the apparatus, ie, the dimension parallel to the longitudinal axis of the cyclone. If the apparatus is used in a vacuum cleaner, compact dust separation apparatus reduced the overall dimensions of the complete cleaner and lowers the centre of gravity of the cleaner which, in turn, increases its stability. This is particularly advantageous in cylinder-type cleaners as well as upright-type vacuum cleaners.

SUMMARY OF THE INVENTION

It is an object of the present invention to provide dust separation apparatus which is relatively compact without any significant loss of dust separation efficiency.

The present invention provides an apparatus for separating dirt or dust from an airflow. The apparatus has a frusto-conical cyclone with a tangential air inlet located at or adjacent to one end of the cyclone having the larger diameter. The apparatus also has a cone opening located at the other end of the cyclone having the smaller diameter.

A collector is arranged to surround the cone opening and has a base surface facing towards the cone opening. The collector has at least one side surface and a dust-retaining wall. The dust-retaining wall has a free upper end and is provided spaced apart from the center of the base surface of the collector. Optionally, a portion of the base surface of the collector can be conical or frusto-conical in shape.

Advantageous features of the present invention will become increasingly apparent by reference to the following drawings and the description.

Dust separation apparatus of the type mentioned at the outset is often required to be located at an angle to a fixed surface. In the case of an upright-type vacuum cleaner, which is restricted in its overall height for practical reasons, the body of the cleaner containing the dust separation apparatus is tilted in use with respect to the cleaner head so as to facilitate the movement of the cleaner head over the surface to be cleaned. Also, in cylinder-type vacuum cleaners, it is advantageous to position the centre of gravity as close as possible to the surface to be cleaned and this can be assisted by tilting the dust separation apparatus with respect to the said surface. It has been known to provide a collector having a base surface with a conical or frusto-conical portion. This allows the apparatus to be tilted without the need to raise the apparatus in the first place. The provision of a conical- or frustoconical-based collector had previously been dismissed as impractical be a cause it was thought that separated dirt and dust would collect closer to the cone opening than in the standard flat-based collector, which would encourage separated dirt and dust to become re-entrained in the airflow. It has since been found that this is not the case and the separation efficiency of a conical- or frustoconical-based collector is very similar to that of a corresponding flat-based collector. However, the provision of dust-retaining means spaced from the centre of the conical- or frustoconical-based collector in accordance with the second aspect of the invention further improves the separation efficiency of the apparatus.

BRIEF DESCRIPTION OF THE DRAWINGS

Embodiments of the invention will now be described with reference to the accompanying drawings, wherein.

DESCRIPTION OF THE PREFERRED EMBODIMENTS

Figure 1:
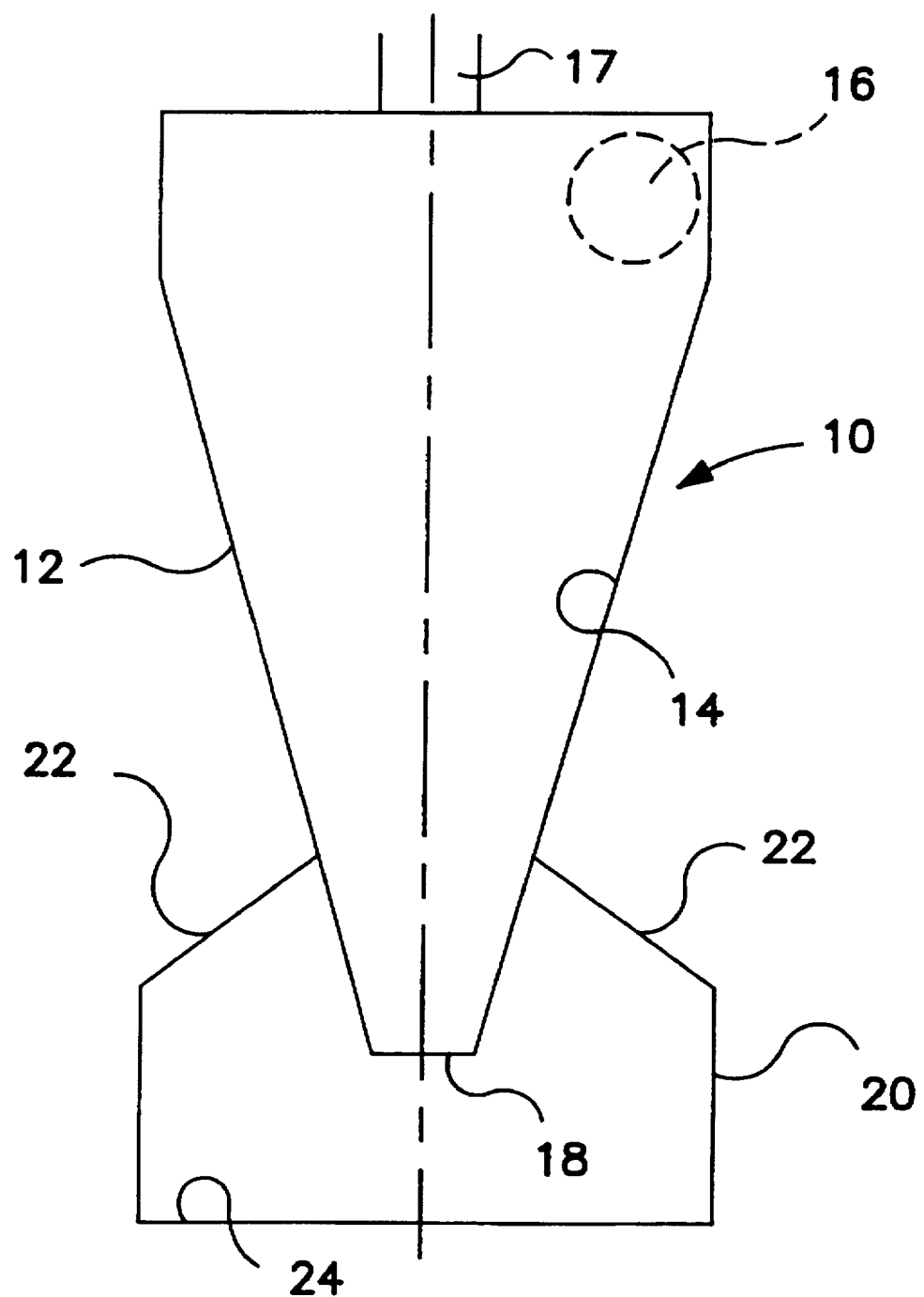
FIG. 1 is a sectional side view of known apparatus for separating dirt or dust from an airflow.

FIG. 1 shows known apparatus 10 for separating dirt or dust from an airflow consisting of a frustoconical cyclone 12 having an interior surface 14. An air inlet 16 is arranged at the end of the cyclone 12 having the larger diameter and the air inlet 16 communicates with the cyclone 12 so as to introduce air tangentially into the cyclone 12.

At the end of the cyclone 12 having the smaller diameter, ie. remote from the air inlet 16, there is a cone opening 18. Surrounding the cone opening 18 and sealed against the outer walls of the cyclone 12 is a collector 20 for collecting dirt and dust separated from the airflow. The main body of the collector 20 is generally cylindrical in shape although inclined walls 22 extend between the generally cylindrical portion and the cyclone 12. The collector 20 has a base surface 24 facing towards the cone opening 18, ie. remote from the main body of the cyclone 12.

In use, an airflow consisting of a stream of air having dirt and dust particles entrained therein enters the cyclone 12 via the inlet 16. Because of the tangential entry arrangement, the dirt-laden airflow takes up a swirling motion inside the cyclone 12 and spirals over the interior surface 14 of the cyclone 12 towards the cone opening 18 at ever-increasing angular speeds, with clean air escaping from the cyclone 12 by moving inwardly towards the longitudinal axis and upwardly towards an exit port 17. As soon as the remainder of the airflow enters the collector 20 via the cone opening 18, the dirt and dust particles entrained within the airflow are flung towards the side walls of the collector 20. The airflow, which is substantially free of dirt and dust particles, then exits the collector 20 via the cone opening 18 and leaves the cyclone 12 by means of the exit port 17 located substantially centrally of the end of the cyclone 12 having the larger diameter.

Figure 3:
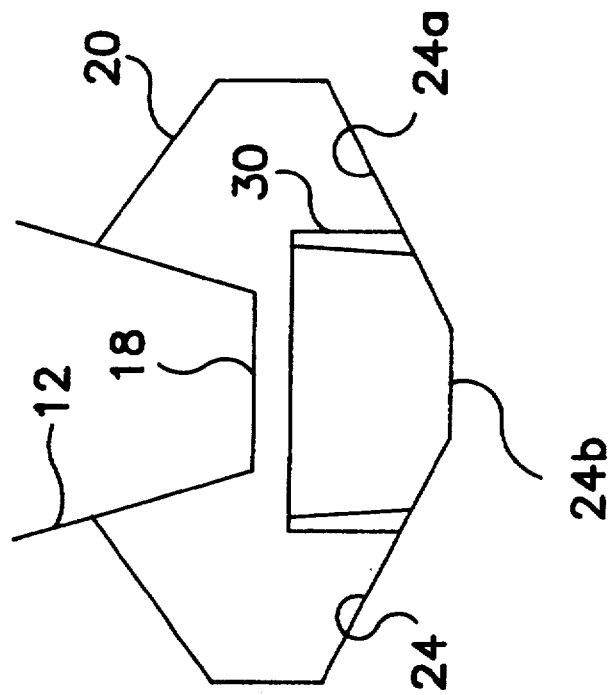
FIG. 3 is a sectional side view, corresponding to FIG. 1, of a second embodiment of the invention.
Figure 2:
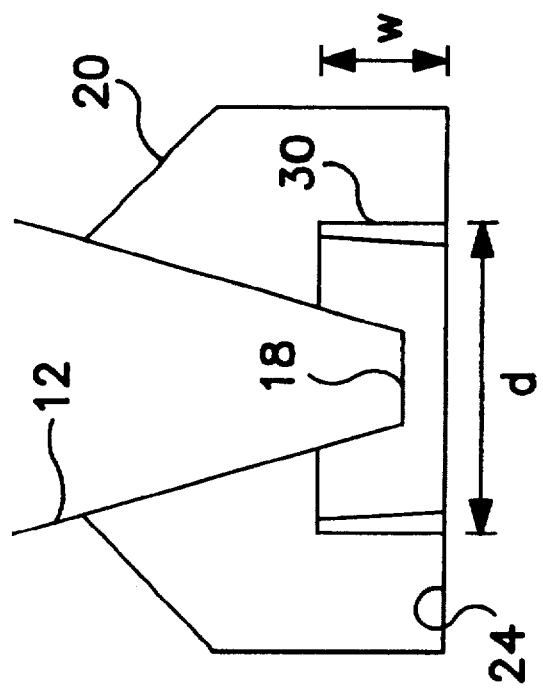
FIG. 2 is a sectional side view, corresponding to part of FIG. 1, of a first embodiment of the present invention.

FIGS. 2 and 3 illustrate the invention which provides an additional measure designed to reduce any possibility of dirt and dust collected in the collector 20 becoming re-entrained in the airflow circulating in the apparatus 10. This measure applies primarily in cases wherein the distance between the cone opening 18 and the base surface 24 is less than 8mm or wherein the base surface 24 is conical or frusto-conical in shape.

In order to reduce the possibility of dirt and dust located in the collector 20 from being re-entrained into the airflow, dirt and dust-retaining means in the form of a wall 30 are provided on the base surface 24. The wall 30 is upwardly extending with respect to the base surface 24 and is substantially annular in shape, although other plan shapes could be utilised. The diameter d of the annular wall 30 is substantially 70 mm but this could be varied within the range 30 mm to 100 mm. The height w of the wall 30 is substantially 55 mm from the junction between the wall 30 and the base surface 24 but could be varied within the range 20 mm to 60 mm.

The wall 30 has a tapering cross-section as shown in FIG. 2. The thickness of the wall 30 is greater at the end thereof adjacent the junction with the base surface 24 than at the distal end. The upper end of the wall 30 is radiused to form a smooth finish.

When the annular wall 30 is provided in conjunction with a frustoconical base surface 24 as shown in FIG. 3, the junction between the wall 30 and the base surface 24 is on the frustoconical portion 24a of the base surface 24. However, if the central portion 24b is sufficiently large in diameter, the junction between the wall 30 and the base surface 24 can occur in the central planar portion 24b.

In operation, air exiting the cyclone 12 via the cone opening 18 causes dirt and dust particles entrained therein to be flung against the outer walls of the collector 20. The annular wall 30 prevents the dirt and dust particles from travelling towards the central portion of the base surface 24 and thereby reduces the possibility of dirt and dust particles becoming re-entrained into the airflow.

Figure 4:
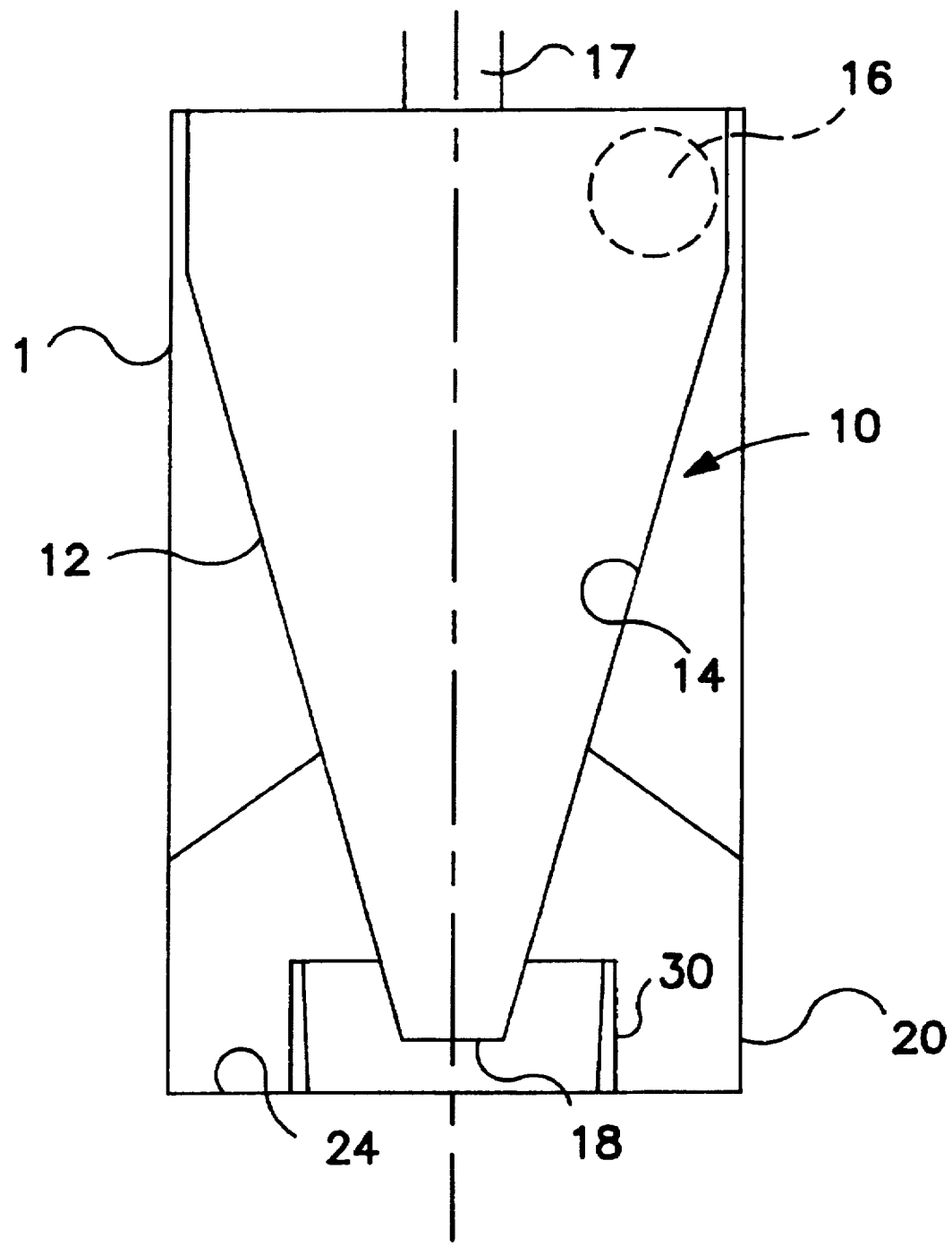
FIG. 4 is a sectional side view of a combination of a low-efficiency cyclone and a frusto-conical cyclone of the invention.

It is envisaged that cyclonic dust separation apparatus as described above can be used to advantage in a number of different situations. The application to which it is envisaged that the present invention is most likely to be applied is that of vacuum cleaning apparatus. Either of the aspects of the invention described above can be used in an upright or cylinder-type vacuum cleaner in order to lower the centre of gravity and/or reduce the size of the apparatus as a whole. It is also likely that the apparatus described above will be used in conjunction with further cyclonic dust separation apparatus specific ally designed to remove larger dust and fluff particles in a so-called "low efficiency" cyclone (1) positioned upstream of the frusto-conical cyclone (12) as shown in FIG. 4. The apparatus described above will therefore be intended to remove only the finer particles of dirt and dust entrained in the airflow.

However, it is also envisaged that the invention described above may well be utilised in other situations, for example the removal or dirt and dust particles from internal combustion engine emissions. The principles described above are equally applicable to such situations and need not be used in combination with further cyclonic separation apparatus unless it is so desired.

We claim:

1. Apparatus for separating dirt or dust from an airflow comprising a frustoconical cyclone having a tangential air inlet located at or adjacent the end of the cyclone having the larger diameter and a cone opening located at the end of the cyclone having the smaller diameter, and a closed collector for collecting dirt or dust separated from the airflow by the cyclone arranged so as to surround the cone opening and having a base surface facing towards the cone opening and at least one side surface, wherein a dust-retaining wall having a free upper end is provided on the base surface spaced from both a center and the side surface thereof.

2. Apparatus as claimed in claim 1 wherein the dust-retaining wall comprises an upwardly-extending annular wall.

3. Apparatus as claimed in claim 2, wherein the wall extends upwardly from the junction thereof with the base surface for between 10 mm and 60 mm.

4. Apparatus as claimed in claim 3 wherein the wall extends upwardly from the junction thereof with the base surface for 55 mm.

5. Apparatus as claimed in any one of claims 2 to 4 wherein a diameter of the wall is between 30 mm and 100 mm.

6. Apparatus as claimed in claim 5 wherein the diameter of the wall is 70 mm.

7. Apparatus as claimed in any one of claims 2 to 4 wherein a thickness of the wall is greater at an end adjacent the junction with the base surface than at the free upper end remote therefrom.

8. Apparatus as claimed in any one of claims 2 to 4 wherein the end of the wall remote from the junction with the base surface is radiused.

9. Apparatus as claimed in any one of claims 1 to 4 wherein at least a portion of the base surface is conical or frustoconical in shape.

10. Apparatus as claimed in claim 9, wherein the base surface comprises a frustoconical portion and a circular portion.

11. Apparatus as claimed in claim 10 wherein a diameter of the circular portion is substantially the same as that of the cone opening.

12. Apparatus as claimed in claim 10 wherein the diameter of the circular portion is between 20 mm and 30 mm.

13. Apparatus as claimed in claim 10 wherein the diameter of the circular portion is 25 mm.

14. Apparatus as claimed in claim 10, wherein the diameter of the circular portion is substantially greater than that of the cone opening.

15. Apparatus as claimed in claim 14 wherein the diameter of the circular portion is 125 mm.

16. Apparatus as claimed in any one of claim 10 wherein the circular portion is planar.

17. Apparatus as claimed in any one of claim 9 wherein the conical or frusto-conical portion of the base surface is inclined at an angle of between 30° and 50° to a longitudinal axis of the cyclone.

18. Apparatus as claimed in claim 17 wherein the conical or frusto-conical portion of the base surface is inclined at an angle of 40° to the longitudinal axis of the cyclone.

19. Apparatus as claimed in claim 1, further comprising further apparatus for separating dirt or dust from the airflow, said further apparatus being positioned upstream of said apparatus.

20. Apparatus as claimed in claim 7 wherein the free upper end of the wall remote from the junction with the base surface is radiused.

21. Apparatus as claimed in claim 7 wherein at least a portion of the base surface is conical or frusto-conical in shape.

22. Apparatus as claimed in claim 8 wherein at least a portion of the base surface is conical or frusto-conical in shape.

23. Apparatus as claimed in claim 20 wherein the base surface comprises a frusto-conical portion and a circular portion.

24. Apparatus as claimed in claim 23 wherein a diameter of the circular portion is substantially the same as that of the cone opening.

25. Apparatus as claimed in claim 11 wherein the diameter of the circular portion is between 20 mm and 30 mm.

26. Apparatus as claimed in claim 23 wherein the diameter of the circular portion is between 20 mm and 30 mm.

27. Apparatus as claimed in claim 23 wherein the diameter of the circular portion is substantially greater than that of the cone opening.

28. Apparatus as claimed in claim 11 wherein the circular portion is planar.

29. Apparatus as claimed in claim 14 wherein the circular portion is planar.

30. Apparatus as claimed in claim 10 wherein the conical or frusto-conical portion of the base surface is inclined at an angle of between 30° and 50° to a longitudinal axis of the cyclone.

31. Apparatus as claimed in claim 11 wherein the conical or frusto-conical portion of the base surface is inclined at an angle of between 30° and 50° to a longitudinal axis of the cyclone.

32. Apparatus as claimed in claim 12 wherein the conical or frusto-conical portion of the base surface is inclined at an angle of between 30° and 50° to a longitudinal axis of the cyclone.

33. Apparatus as claimed in claim 14 wherein the conical or frusto-conical portion of the base surface is inclined at an angle of between 30° and 50° to a longitudinal axis of the cyclone.

34. Apparatus as claimed in claim 16 wherein the conical or frusto-conical portion of the base surface is inclined at an angle of between 30° and 50° to a longitudinal axis of the cyclone.

35. Apparatus for separating dirt or dust from an airflow comprising a frusto-conical cyclone having a tangential air inlet located at or adjacent the end of the cyclone having the larger diameter and a cone opening located at the end of the cyclone having the smaller diameter, and a closed collector arranged so as to surround the cone opening and having a base surface facing towards the cone opening, wherein at least a portion of the base surface is conical or frusto-conical in shape and wherein a dust-retaining wall is provided on the base surface spaced from a center of the base surface.

36. Apparatus as claimed in claim 35 wherein the base surface has a frusto-conical portion and a circular portion.

* * * * *

UNITED STATES PATENT AND TRADEMARK OFFICE
CERTIFICATE OF CORRECTION

PATENT NO. : 5,893,938
DATED : April 13, 1999
INVENTOR(S) : James Dyson, Andrew Walter McRae Thomson, and Simon Mark Bickerstaff It is certified that error appears in the above—identified patent and that said Letters Patent is hereby corrected as shown below:

Column 2, line 15, "be a cause" should be --because--.

Column 3, line 60, "specific ally" should be --specifically--.

Column 4, line 1, "removal or dirt" should be --removal of dirt--.

Column 4, line 55 (Claim 16), "claimed in any one of Claim 10" should be --claimed in Claim 10--.

Column 4, line 57 (Claim 17), "claimed in any one of Claim 9" should be --claimed in Claim 9--.

Signed and Sealed this

Twenty-third Day of November, 1999

Q. TODD DICKINSON

Attest:

Attesting Officer

Acting Commissioner of Patents and Trademarks